United States Patent Office 3,657,300
Patented Apr. 18, 1972

3,657,300
PREPARATION OF DIHYDROCARBYL ALUMINUM HALIDES AND DIHYDROCARBYL ALUMINUM ALKOXIDES
Phillip R. Beaver and James C. Geddes, Jr., Baton Rouge, La., assignors to Ethyl Corporation, New York, N.Y.
No Drawing. Filed Feb. 2, 1970, Ser. No. 8,024
Int. Cl. C07f 5/06
U.S. Cl. 260—448 A
11 Claims

ABSTRACT OF THE DISCLOSURE

It is disclosed that high purity dihydrocarbyl aluminum halides and dihydrocarbyl aluminum alkoxides are produced by a plural step process which involves a reaction to produce a hydrocarbyl aluminum dihalide or hydrocarbyl aluminum dialkoxide which is purified by distillation and then reacted with trihydrocarbyl aluminum in about stoichiometric proportions to produce the desired product without requiring further purification.

BACKGROUND OF THE INVENTION

Field of the invention

The invention relates to the preparation of dihydrocarbyl aluminum halides and dihydrocarbyl aluminum alkoxides of high purity.

Description of the prior art

The prior art for producing the foregoing compounds generally involves a reaction of two mols of trihydrocarbyl aluminum and one mol of aluminum trihalide or aluminum trialkoxide followed by a distillation separation seeking to recover a purified product. Such process is subject to numerous disadvantages. The dihydrocarbyl aluminum halides decompose at a significant rate at virtually any temperature useful for distillation. The result of this is generally the formation of by-products such as hydride compounds, and alkyl aluminum dihalides and even the liberation of aluminum. The alkyl aluminum dihalides are particularly troublesome in such distillation purification of the product dialkyl aluminum halides because they have generally higher vapor pressures than the desired dialkyl aluminum halides.

In any event, for whatever the cause, such distillation does not give a desired high purity clear, colorless dialkyl aluminum halide or alkoxide product.

Filtration purification can be helpful in removing solids such as $Al_2O_3$, aluminum and impurities in the reactants; however, even this does not provide a clear, colorless product.

Thus poor yields and poor purity of product are characteristic of prior art processes leading to high costs and restricted usage of the products.

Products of the present process have uses in numerous ways, e.g. as catalysts and as chemical intermediates.

SUMMARY OF THE INVENTION

In accordance wtih the present invention, a process is provided for producing dihydrocarbyl aluminum halides and dihydrocarbyl aluminum alkoxides and mixtures thereof by reacting a hydrocarbyl aluminum sesquihalide or a hydrocarbyl aluminum sesquialkoxide or a trihydrocarbyl aluminum compound or mixtures thereof with an aluminum trihalide or an aluminum trialkoxide or a mixture thereof at a temperature from about 0° C. to about 200° C. to produce a hydrocarbyl aluminum dihalide or a hydrocarbyl aluminum dialkoxide, or a mixture thereof, and then distilling the product of the foregoing reaction at a pressure from about 75 to about 760 millimeters of mercury absolute and below decomposition temperatures to recover purified hydrocarbyl aluminum dihalide of hydrocarbyl aluminum dialkoxide, or a mixture thereof, and then reacting the recovered hydrocarbyl aluminum halide or alkoxide from the distilling operation with an aluminum trihydrocarbyl compound in approximately equimolar proportions at a temperature from about 0° C. to about 200° C. to produce dihydrocarbyl aluminum halide or dihydrocarbyl aluminum alkoxide or a mixture thereof.

In one aspect of the present invention, an impure intermediate hydrocarbyl aluminum halide or alkoxide or mixture thereof is produced as, for example, by an antecedent combining of a trihydrocarbyl aluminum compound and aluminum trihalide or trialkoxide or mixtures thereof at a temperature of from about 0° C. to about 200° C. This intermediate is then fed to the aforesaid first reacting step of the preferred principal process as set forth in the preceding paragraph.

A particularly important independent advantage of the present process is the effect upon distillation costs. In typical examples relating to the production of di-isobutyl aluminum chloride, the amount of intermediate isobutyl aluminum dichloride that is distilled is about 44 pounds per 100 pounds of product di-isobutyl aluminum chloride. This represents a plural advantage in smaller quantity of material distilled, in the relative ease of distillation because of the significantly greater vapor pressure of the intermediate relative to the product, and in the reduction of losses due to decomposition when distilling the isobutyl aluminum dichloride.

Hydrocarbyl as used herein designates organic radicals containing hydrogen and at least one carbon atom. A simple illustration is methyl. Although there is no rigid limit upon the carbon skeletal configurations of the radicals, physical considerations of boiling points, melting points, etc. generally provide a preference for saturated radicals having up to about 20 carbon atoms, with the range of from 1 to about 6 carbon atoms generally most preferred for ease of handling, reactivity and maximum content of aluminum on a weight basis. Preferred forms of radicals are those characterized by straight or branched chain carbon skeletal configuration including cyclic and alicyclic structures which in turn include aromatic as well as substituted and unsubstituted cyclic saturated and unsaturated radicals. Thus, hydrocarbyl includes alkyl, cycloalkyl, alkenyl, aryl, aralkyl, alkaryl, cycloalkenyl, alkynyl and like hydrocarbon radicals.

The term alkoxide is used herein to designate a radical containing a hydrocarbyl radical as defined in the foregoing which is linked to aluminum via an oxygen atom. It is also suitably called a hydrocarbyloxy radical. In many instances the carbon skeletal configurations of the alkoxide radicals are the same as in the hydrocarbyl radicals directly bonded to the aluminum such as in diethyl aluminum ethoxide. On the other hand, such is not an inherent or necessary limitation and mixtures with respect to various radicals in both the hydrocarbyl and alkoxide portions are included. Typical hydrocarbyl aluminum sesquialkoxides have hydrocarbyl groups which are several or all of ethyl, butyl, hexyl, octyl, decyl, dodecyl, tetradecyl, hexadecyl, octadecyl, eicosyl, etc. as obtained, for example, in aluminum chemistry chain growth or displacement processes such as discussed in U.S. Pats. 3,384,651 and 3,415,861. One of the features of the present process is the ease of production of products in which the R radicals of the OR radicals are different from the R radicals directly attached to aluminum.

The term halogen means any halogen with a particular preference for fluorine, bromine, chlorine or iodine because of ready availability and reactivity.

Typical aluminum trihalides are aluminum chloride, aluminum bromide, aluminum fluoride and aluminum iodide. Aluminum chloride is preferred because of ease of preparation, low cost and reactivity.

Typcial trihydrocarbyl aluminum compounds used in the process are trioctyl aluminum, tridecyl aluminum, tridodecyl aluminum, tris-tridecyl aluminum, tritetradecyl aluminum, trihexadecyl aluminum, trioctadecyl aluminum, trieicosyl aluminum, etc. Others are tricyclohexyl aluminum, dimethylcyclohexyl aluminum, trivinyl aluminum, trioctenyl aluminum, triphenyl aluminum, tridiphenyl aluminum, tritolyl aluminum, trixylyl aluminum, tribenzyl aluminum, tri-2-phenethyl aluminum, tricumenyl aluminum, tri-4-cyclohexenyl aluminum, triheptynyl aluminum, tricitronellyl aluminum, trivinyl cyclohexyl aluminum, trimesityl aluminum, and the like.

Particularly preferred hydrocarbyl aluminum compounds are alkyl aluminum compounds having from 1 to 6 carbon atoms per alkyl radical such as trimethyl aluminum, triethyl aluminum, tripropyl aluminum, tri-n-butyl aluminum, triisobutyl aluminum and trihexyl aluminum. These are readily prepared and have excellent reaction characteristics in the present process.

Typical hydrocarbyl aluminum sesquihalides of the present process include ethyl aluminum sesquichloride, isobutyl aluminum sesquichloride, n-butyl aluminum sesquichloride, propyl aluminum sesquibromide, hexyl aluminum sesquiiodide, octyl aluminum sesquifluoride, 6-heptenyl aluminum sesquichloride, octadecyl aluminum sesquichloride, eicosyl aluminum sesquichloride, phenethyl aluminum sesquibromide, vinyl cyclohexyl aluminum sesquiiodide, cyclohexyl aluminum sesquifluoride, octenyl aluminum sesquibromide, diphenyl aluminum sesquiiodide, tolyl aluminum sesquichloride, xylyl aluminum sesquiiodide, benzyl aluminum sesquifluoride, 2-phenethyl aluminum sesquichloride, cumenyl aluminum sesquiiodide, 4-cyclohexenyl aluminum sesquiiodide, citronellyl aluminum sesquichloride and the like.

In general, prefererd sesqui compounds are those in which the hydrocarbyl radicals have from 1 to 6 carbon atoms and wherein the halogen is chlorine. Exemplary of such preferred compounds are ethyl aluminum sesquichloride and isobutyl aluminum sesquichloride.

The term hydrocarbyl aluminum sesquihalide is a term that is recognized in the art to include in a restrictive sense those compounds of a general formula $R_{1.5}AlX_{1.5}$. It is generally recognized that such materials may actually exist or appear to exist in a dimeric form such as $R_3Al_2X_3$, and even in higher orders. Also it is recognized that such compounds in many instances are or appear to be or to react as mixtures of several compounds, for example, $R_{1.5}AlX_{1.5}$ may have certain properties and reaction characteristics of containing monomeric, dimeric and polymeric forms and also individual materials such as $R_3Al$ and $AlX_3$. It is also understood that within the broad meaning of the term hydrocarbyl aluminum sesquihalide, as included herein, the subscripts for the hydrocarbyl and halogen radicals are not necessarily limited to 1.5 but allow an excess of the compounds $R_3Al$ or $AlX_3$ to be present together with the compounds $R_{1.5}AlX_{1.5}$. Generally speaking, the compounds $R_2AlX$ and $RAlX_2$ can exist as pure compounds and can have co-present $R_3Al$ or $AlX_3$.

Similar considerations to the foregoing for hydrocarbyl aluminum sesquihalides and the meaning of the term are applicable to the hydrocarbyl aluminum sesquialkoxides.

Typical hydrocarbyl aluminum sesquialkoxides of the present process include ethyl aluminum sesquibutoxide, isobutyl aluminum sesquiethoxide, n-butyl aluminum sesquibutoxide, propyl aluminum sesquiphenoxide, hexyl aluminum sesquicyclohexoxide, octyl aluminum sesquibenzyloxide, 6-heptenyl aluminum sesquioctenyl oxide, octadecyl aluminum sesquieicosoxide, eicosyl aluminum sesquiphenethioxide, and the like.

Typical aluminum trialkoxides of the present process are aluminum triisopropoxide, aluminum triethoxide, aluminum triisobutoxide, aluminum tridodecoxide, aluminum tri-tetradecoxide, aluminum tri-cyclohexoxide, aluminum tris(dimethyl cyclohexoxide, aluminum trivinyl oxide, aluminum trioctenyloxide, aluminum triphenoxide, aluminum tritolyloxide, aluminum trixylyloxide, aluminum tribenzyloxide, aluminum tris-2-phenethoxide, aluminum tricumenyloxide, aluminum tris-4-cyclohexenyloxide, aluminum triheptynyloxide, aluminum trieicosoxide, and aluminum tri-citronellyloxide.

The product compounds are, in general, the dependent result of the selection of the reactants. Thus a typical product compound is diisobutyl aluminum chloride which is obtained for example by the reaction of triisobutyl aluminum and aluminum trichloride or the reaction of isobutyl aluminum dichloride and triisobutyl aluminum and the like to illustrate the general relationships resulting from the foregoing.

Typical product compounds are dimethyl aluminum chloride, methyl ethyl aluminum chloride, diethyl aluminum chloride, diisobutyl aluminum chloride, ethyl isobutyl aluminum chloride, di-n-octyl aluminum chloride, di-sec-butyl aluminum chloride, di-2-ethyl hexyl aluminum chloride, dicyclohexyl aluminum chloride, di-octadecyl aluminum chloride, bis-dimethyl cyclohexyl aluminum chloride, divinyl aluminum chloride, dioctenyl aluminum chloride, diphenyl aluminum choride, ditolyl aluminum chloride, dixylyl aluminum chloride, dibenzyl aluminum chloride, bis-2-phenethyl aluminum chloride, dicumenyl aluminum chloride, bis-4-cyclohexenyl aluminum chloride, diheptynyl aluminum chloride, bis-eicosyl aluminum chloride, dicitronellyl aluminum chloride.

Other typical product compounds are similar dialkyl aluminum compounds of the other halogens, fluorine, bromine and iodine, such as diisobutyl aluminum fluoride, diisobutyl aluminum bromide, and diisobutyl aluminum iodide.

Other typical product compounds are similar dialkyl aluminum alkoxide compounds such as diisobutyl aluminum ethoxide, diisobutyl aluminum isopropoxide, diisobutyl aluminum isobutoxide, diisobutyl aluminum n-butoxide, diisobutyl aluminum decoxide, diisobutyl aluminum eicoside, diisobutyl aluminum cyclohexoxide, diisobutyl aluminum 2-ethyl hexoxide, diethyl aluminum ethoxide and the like.

It is desirable to provide ample agitation or turbulence in the reaction system to insure thorough mixing of the reactants in the various reactions and intimate contact between the various materials involved. If desired, suitable anhydrous solvents which do not adversely affect the desired reaction may be employed. Exemplary of such solvents are saturated aliphatic hydrocarbons, for example, paraffinic hydrocarbons, cycloparaffinic hydrocarbons, or mixtures thereof, aromatic hydrocarbons, saturated fluorocarbons, silicone oils. Also included as suitable liquid solvent is the alkyl aluminum halide product as well as the intermediates. Thus, in many instances it is desirable to provide a heel of the product that is present in the system from the beginning as by retention from a previous batch or by the in situ formation of such material by a preliminary reaction of trihydrocarbyl aluminum and aluminum trihalide or aluminum trialkoxide in stoichiometric (not equimolar) proportions.

Other solvents include tertiary amines such as trimethyl amine; ethers, such as diethyl ether, dioxane, tetrahydrofuran and in general non-reactive bases. Some of the solvents of this paragraph form complexes with products of reactants; however, this is not an essential aspect of this category of solvents.

Additional typical solvents are pentane, hexane, cyclohexane, heptane, octane, benzene, toluene, xylene and like saturated aliphatic and aromatic hydrocarbons, individually and in various mixtures and isomers.

Suitable temperatures for the process are limited, for the most part, by rate and side-reaction considerations. The process is suitably conducted over a range of temperatures from about 0 to about 200° C. Sufficiently high temperatures are desirable to provide an acceptable reaction rate for the principal desired reactions, particularly for the reaction of the aluminum trihalide or aluminum trialkoxide. On the other hand, desired temperatures avoid or at least provide a tolerable limitation upon the extent of coincidental side reactions. In particular, a side reaction of importance is the decomposition of hydrocarbyl aluminum compounds to form aluminum or aluminum hydride compounds. In general, the temperatures at which such decomposition side reactions become appreciable vary depending upon the specific hydrocarbyl radicals present in the environment and are well known or readily ascertained for various hydrocarbyl radicals. Thus, where an acceptable rate for the decomposition reaction is about 0.1 to 0.2 percent per hour, reaction temperatures of the order of 50° C. to 80° C. are highly preferred for easily decomposed compounds such as the branched alkyl compounds, typically the isobutyl aluminum compounds. Higher temperatures such as 125 to 180° C. are permissible and even desirable for other compounds of higher thermal stability such as unbranched alkyl compounds, typically ethyl aluminum compounds, particularly where high rates for the principal reactions are of main concern.

The concluding reaction involving the distilled hydrocarbyl aluminum dihalide or hydrocarbyl aluminum dialkoxide proceeds rapidly at low temperatures; therefore, preferred temperatures for this reaction are from about 0° C. to about 100° C. even with the highly stable compounds.

Preferred ranges of temperatures (for the concluding reaction) are from about 20 to about 80° C. for the easily decomposed compounds such as isobutyl compounds. The aforementioned narrower range of about 50° to 80° C. is highly preferred for these materials for the reaction involving aluminum trihalide or aluminum trialkoxide while a narrower most preferred range for the concluding reaction with trihydrocarbyl aluminum is from about 20 to about 70° C. Typical reaction temperatures for these materials for the two reactions are; respectively, 50°, 60°, 70°, and 80° C.; and 30°, 40°, and 50° C. Such preferred ranges of temperatures and such specific temperatures are also applicable to all compounds, broadly, particularly where minimizing side reactions is desirable.

Pressures for the most part are not critical and are autogenous or atmospheric for the temperatures selected for the reactions per se. With respect to the distillations, reduced pressures are generally desirable to minimize decompositions and side reactions. The pressures are generally from about 75 to about 760 mm. of mercury absolute with a narrower range of from about 100 to 250 mm. usually preferred. A typical distillation pressure is 100 mm., the temperature corresponding to the vapor pressures of the components present in the system. Distillation temperatures up to about 200° C. are suitable for less stable branched alkyl compounds such as isobutyl aluminum dichloride. Higher temperatures up to about 250° C. are suitable for the more stable open chain unbranched alkyl compounds.

EXAMPLE I 480 grams of aluminum chloride (3.6 mols) were slowly added to 355 grams of triisobutyl aluminum (1.79 mols) in a stirred reaction vessel provided with means for temperature control. The temperature was maintained at 60° C. during this period. Following the addition period, the temperature of the reaction mass was brought to 100° C. and held there for 45 minutes. A simple batch distillation without rectification was carried out at 75–80 mm. of mercury absolute pressure with the pot temperature ranging from 170–175° C. The product overhead amounted to 613 grams and was analyzed to contain 17.34 wt. percent aluminum and 45.02 wt. percent chloride, approximately theoretical for isobutyl aluminum dichloride. A quantity of 222 grams remained in the pot and was used as a heel for Example II.

To 40 grams of the overhead intermediate product was added 50 grams of triisobutyl aluminum. The mixture remained clear and colorless. The final product contained 15.27 percent aluminum and 20.01 wt. percent chloride. The theoretical values for diisobutyl aluminum chloride are 15.28 percent aluminum and 20.06 percent chlorine.

EXAMPLE II 236 grams of triisobutyl aluminum (1.19 mols) was added to the 222 grams heel remaining in the pot from Example I. During the addition, the temperature of the reaction mass was not allowed to exceed 60° C. Then 319 grams of aluminum chloride (2.39 mols) were rapidly added without noticeable evolution of heat. The reaction mass was heated to 100° C. and held at that temperature for 45 minutes. A simple batch distillation of the reaction product was carried out and 559 grams were distilled over at a pot temperature of 174–178° C. at a pressure of 73 to 81 mm. of mercury absolute. The overhead product was analyzed to contain 17.24 percent aluminum and 44.94 percent chlorine.

To 50 grams of this intermediate product material was added with agitation 62 grams of triisobutyl aluminum. The final mixture remained clear and colorless and contained 15.23 percent aluminum and 20.07 percent chloride, close to theoretical for diisobutyl aluminum chloride.

EXAMPLE III

Example I is repeated with triethyl aluminum and aluminum chloride to produce ethyl aluminum dichloride which is recovered by distillation and then reacted with additional triethyl aluminum to give product diethyl aluminum chloride. Similar desirable results are obtained.

EXAMPLE IV

Example I is repeated with triisobutyl aluminum and aluminum bromide to produce isobutyl aluminum dibromide which is recovered by distillation and then reacted with additional triisobutyl aluminum to give product diisobutyl aluminum bromide. Similar desirable results are obtained.

EXAMPLE V

Example I is repeated with triisobutyl aluminum and aluminum triisobutoxide to produce isobutyl aluminum diisobutoxide which is recovered by distillation and then reacted with additional triisobutyl aluminum to give product diisobutyl aluminum isobutoxide. Similar desirable results are obtained.

EXAMPLE VI

Example I is repeated with tri-normal propyl aluminum and aluminum triethoxide to produce n-propyl aluminum diethoxide which is recovered by distillation and then reacted with additional tri-normal propyl aluminum to give product di-normal propyl aluminum ethoxide. Similar desirable results are obtained.

EXAMPLE VII

Example I is repeated with other hydrocarbyl aluminum sesquihalides or hydrocarbyl aluminum sesquialkoxides or trihydrocarbyl aluminum compounds or mixtures as defined herein and with other aluminum trihalides or aluminum trialkoxides as defined herein to produce intermediate hydrocarbyl aluminum dihalide or hydrocarbyl aluminum dialkoxide or mixtures thereof and wherein said intermediate is recovered and then reacted with trihydrocarbyl aluminum to produce dihydrocarbyl aluminum halide or dihydrocarbyl aluminum dialkoxide or mixtures thereof.

We claim:

1. A process for producing dihydrocarbyl aluminum halides and dihydrocarbyl aluminum alkoxides and mixtures thereof wherein the hydrocarbyl radicals contain up to about 20 carbon atoms each, which comprises:
   (a) reacting a hydrocarbyl aluminum sesquihalide or a hydrocarbyl aluminum sesquialkoxide or a trihydrocarbyl aluminum compound or a mixture thereof, the hydrocarbyl radicals of said compounds containing up to about 20 carbon atoms each, with an aluminum trihalide or an aluminum trialkoxide or a mixture thereof at a temperature from about 0° C. to about 200° C. to produce a hydrocarbyl aluminum dihalide or a hydrocarbyl aluminum dialkoxide, or a mixture thereof,
   (b) distilling the product of step (a) at a pressure from about 75 to about 760 millimeters and below decomposition temperatures to recover purified hydrocarbyl aluminum dihalide or hydrocarbyl aluminum dialkoxide, or a mixture thereof, and
   (c) reacting the recovered hydrocarbyl aluminum from step (b) with an aluminum trihydrocarbyl compound in which the hydrocarbyl radicals contain up to about 20 carbon atoms each, in approximately equimolar proportions at a temperature from about 0° C. to about 200° C. to produce dihydrocarbyl aluminum halide or dihydrocarbyl aluminum alkoxide or a mixture thereof.

2. A process for producing dihydrocarbyl aluminum halides and dihydrocarbyl aluminum alkoxides and mixtures thereof wherein the hydrocarbyl radicals contain up to about 20 carbon atoms each, which comprises:
   (a) combining a trihydrocarbyl aluminum compound wherein the hydrocarbyl radicals contain up to about 20 carbon atoms each with an aluminum trihalide or an aluminum trialkoxide or a mixture thereof at a temperature from about 0° C. to about 200° C. to produce intermediate dihydrocarbyl aluminum halide or dihydrocarbyl aluminum alkoxide, or a mixture thereof,
   (b) reacting the intermediate from step (a) with an aluminum trihalide or an aluminum trialkoxide or a mixture thereof at a temperature from about 0° C. to about 200° C. to produce a hydrocarbyl aluminum dihalide or a hydrocarbyl aluminum dialkoxide, or a mixture thereof,
   (c) distilling the product of step (b) at a pressure from about 75 to about 760 millimeters and below decomposition temperatures to recover purified hydrocarbyl aluminum dihalide or hydrocarbyl aluminum dialkoxide, or a mixture thereof, and
   (d) reacting the recovered hydrocarbyl aluminum from step (c) with an aluminum trihydrocarbyl compound wherein the hydrocarbyl radicals contain up to about 20 carbon atoms each in approximately equimolar proportions at a temperature from about 0° C. to about 200° C. to produce dihydrocarbyl aluminum halide or dihydrocarbyl aluminum alkoxide or a mixture thereof.

3. The process of claim 1 where the temperature of step (a) is from about 0° to about 200° C., and the temperature of step (b) is from about 0° to about 100° C.

4. The process of claim 1 for producing dihydrocarbyl aluminum chloride where the hydrocarbyl constituency is lower alkyl having from 1 to about 6 carbon atoms.

5. The process of claim 1 for producing dihydrocarbyl aluminum chlorides where the hydrocarbyl constituency is lower alkyl having from 1 to about 6 carbon atoms, the temperature of step (a) is from about 20° to about 80° C., and the temperature of step (b) is from about 20° to about 70° C.

6. The process of claim 1 wherein the hydrocarbyl constituency is isobutyl, the temperature of step (a) is from about 20° to about 80° C., the temperature of step (b) is from about 20° to about 70° C., and the pressure of the distillation is about 75 mm. of mercury absolute.

7. The process of claim 1 where the hydrocarbyl constituency is isobutyl, the temperature of step (a) is from about 50° to about 80° C., the temperature of step (b) is from about 20° to about 70° C., and the pressure of the distillation is about 75 mm. of mercury absolute.

8. The process of claim 1 where the hydrocarbyl constituency is ethyl, the temperature of step (a) is from about 125° to about 180° C., and the temperature of step (b) is from about 0° to about 100° C.

9. The process of claim 1 for producing dihydrocarbyl aluminum chlorides where the trihydrocarbyl aluminum is triisobutyl aluminum, the aluminum trihalide is aluminum chloride, the temperature of step (a) is from about 20° to about 80° C., and the temperature of step (b) is from about 20° to about 70° C.

10. The process of claim 1 for producing a dihydrocarbyl aluminum alkoxide where the hydrocarbyl constituency and alkoxide constituency contains lower alkyl having from 1 to about 6 carbon atoms.

11. The process of claim 1 for producing a dihydrocarbyl aluminum alkoxide where the hydrocarbyl constituency and alkoxide constituency consists essentially of isobutyl radicals.

References Cited

UNITED STATES PATENTS

| | | | |
|---|---|---|---|
| 2,270,292 | 1/1942 | Grosse | 260—448 A |
| 3,179,677 | 4/1965 | Walde | 260—448 A |
| 2,969,384 | 1/1961 | Hamprecht et al. | 260—448 AD |
| 3,066,162 | 11/1962 | Ziegler et al. | 260—448 AD |
| 3,399,221 | 8/1968 | Bertoni et al. | 260—448 A |
| 3,400,170 | 9/1968 | Presswood et al. | 260—448 AD |
| 3,412,124 | 11/1968 | Moretti et al. | 260—448 A |
| 3,392,180 | 7/1968 | Hamilton | 260—448 AD X |

TOBIAS E. LEVOW, Primary Examiner

H. M. S. SNEED, Assistant Examiner

U.S. Cl X.R.

260—448 AD